April 29, 1941. H. G. BLOSSER Re. 21,783

APPROACH CONTROL APPARATUS FOR RAILWAY-SIGNALING SYSTEMS

Original Filed July 29, 1938 3 Sheets-Sheet 1

INVENTOR
Herman G. Blosser
BY
his ATTORNEY

April 29, 1941. H. G. BLOSSER Re. 21,783

APPROACH CONTROL APPARATUS FOR RAILWAY SIGNALING SYSTEMS

Original Filed July 29, 1938 3 Sheets-Sheet 2

INVENTOR
Herman G. Blosser.
BY
his ATTORNEY

April 29, 1941. H. G. BLOSSER Re. 21,783
APPROACH CONTROL APPARATUS FOR RAILWAY SIGNALING SYSTEMS
Original Filed July 29, 1938 3 Sheets-Sheet 3
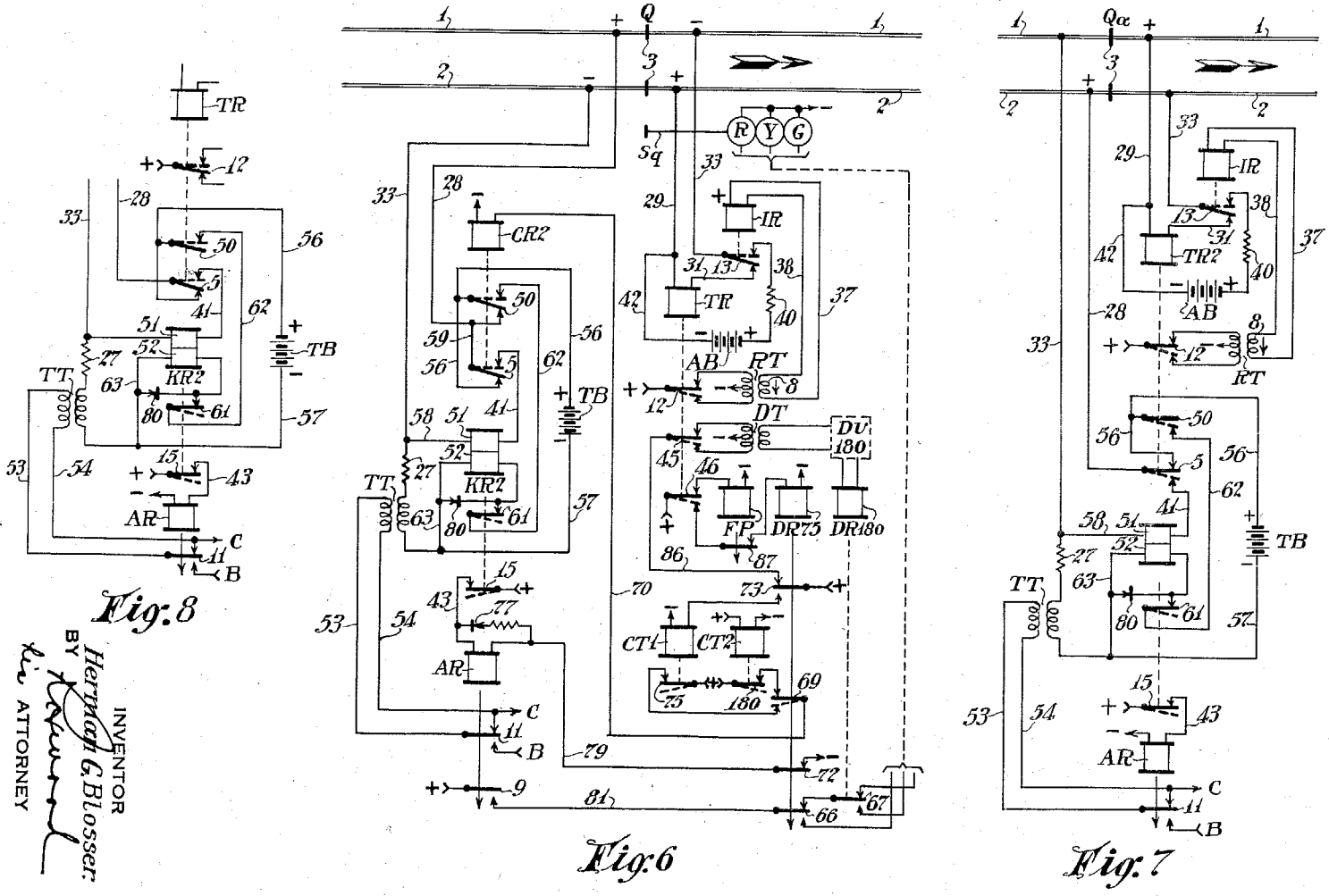
INVENTOR
Herman G. Blosser
BY
his ATTORNEY Reissued Apr. 29, 1941

Re. 21,783

UNITED STATES PATENT OFFICE 21,783

APPROACH CONTROL APPARATUS FOR RAILWAY SIGNALING SYSTEMS

Herman G. Blosser, Pittsburgh, Pa., assignor to The Union Switch & Signal Company, Swissvale, Pa., a corporation of Pennsylvania Original No. 2,174,255, dated September 26, 1939, Serial No. 222,014, July 29, 1938. Application for reissue September 25, 1940, Serial No. 358,319

23 Claims. (Cl. 246—38)

My invention relates to approach control apparatus for use in railway signaling systems of the coded track circuit class and it has special reference to the employment of such apparatus for approach controlling various signaling functions without the use of line wires.

Generally stated, the object of my invention is to improve certain features of an approach control without line wire scheme wherein the rails of each unoccupied signal block length of track transmit code step pulses of auxiliary energy forwardly from the block entrance to effect the energization of a slow release approach relay at the block exit.

A more specific object is to supply the referred to pulses of auxiliary energy to the entrance end of each track circuit in an improved manner which does not interfere with the normal code following operation of the associated signaling system track relay and which eliminates wastage of power at the location of that relay.

Another object is to receive these pulses at the exit end of the track circuit and to energize the associated slow release approach relay in step with them in a novel manner which reduces the necessary delay period of that relay and thereby quickens its response to the entry of a train into the signal block.

An additional object is to provide for a double functioning of the contacts of the track circuit coding devices in their control of the combined signaling and approach governing equipment which is installed at the exit end of each signal block.

A further object is to extend the length of the track circuit which the non line wire apparatus herein disclosed is capable of approach controlling without the aid of cut section facilities.

A still further object is to provide cut section facilities which are suitable for use with approach control schemes which embody my improved features.

In practicing my invention I attain the above and other objects and advantages by transferring the entrance end connection of the track circuit from the signaling system track relay to a source of auxiliary energy at the beginning of each "off" code period and returning it to the track relay before the beginning of the next "on" period; by providing the exit end of each track circuit with a code following detector relay which is operated by auxiliary energy received from the rails, which is equipped with a supplemental "stick" circuit and other special release delaying means, and which locally controls the energization of the associated slow release approach relay; by carrying the pick-up and the stick circuits of the detector relay through separate contacts of the signaling system coding device and so arranging these two contacts that they act in parallel in making and breaking the circuit over which the rails receive coded signal control energy; and by interposing a sensitive code following pilot relay between the rails and the multi-contact code following track relay which is operated by entrance end energy received therefrom.

I shall describe a few forms of approach control apparatus embodying my invention and shall then point out the novel features thereof in claims. These illustrative embodiments are disclosed in the accompanying drawings in which:

Figs. 5 and 6 are diagrammatic showings of signal location equipments in which my improved approach control apparatus is combined with two different forms of signaling system decoding apparatus; and Figs. 7 and 8 are similar views of further forms of cut section facilities which are suitable for use with the approach control schemes disclosed herein.

Figure 1:
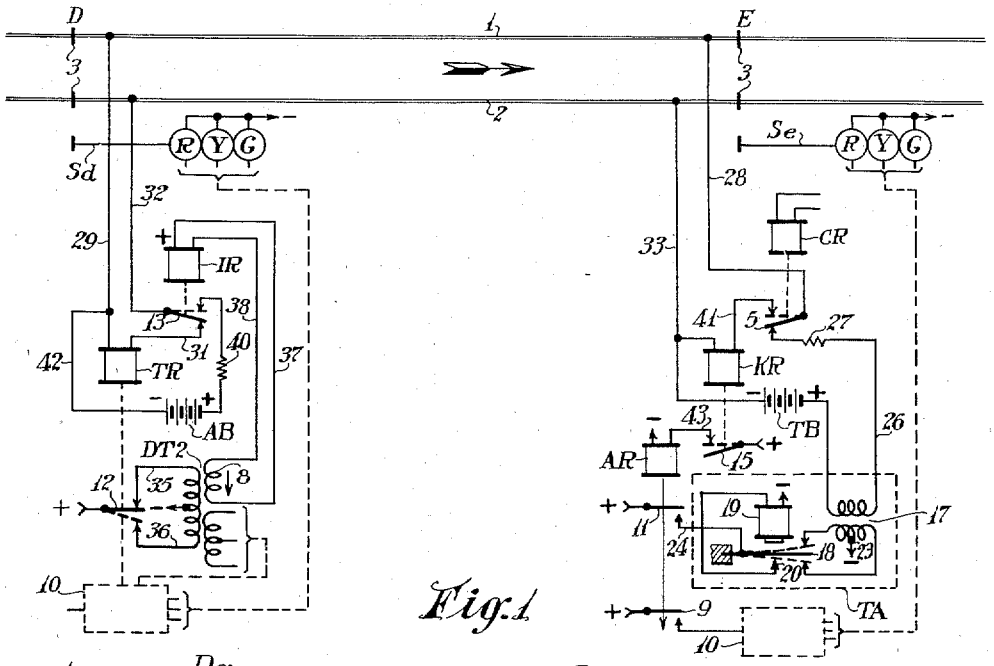
Fig. 1 is a diagrammatic representation of a single section of railway track which is equipped with one preferred form of my improved non line wire approach control equipment.

In the several views of the drawings, like reference characters designate corresponding parts. Referring first to Fig. 1, the improved approach control apparatus of my invention is there disclosed in association with a coded track circuit system of automatic block signaling for a railway track 1—2 over which it will be assumed that traffic moves in the single direction indicated by the arrow, or from left to right in the diagram. The protected stretch of this track is divided into the customary successive sections by insulated rail joints 3 and the rails of each section form a part of a track circuit to which coded signal control energy is supplied in customary manner.

In this view of Fig. 1, reference characters D and E respectively designate the entrance and the exit ends of one of these track sections which is illustratively shown as being a full signal block in length; character TR designates a code following track relay which is installed at the entrance end of the section and operated by energy received from the rails thereof; character TB a track battery or other direct current source provided at the section exit for the purpose of supplying these rails with the relay operating energy just referred to; character CR a coding device having a contact 5 which codes this energy by periodically interrupting the rail supply circuit; and character S the usual wayside signal which guards the entrance of each of the track blocks and which is controlled by the associated track relay TR through the medium of decoding apparatus 10.

An automatic block signaling system of the referred to coded track circuit type operates without the aid of line wires and in representative form it includes all of the elements above named. Such a system further comprises the customary facilities (not shown in Fig. 1) for continuously operating each of the exit end relays CR at one or another of the usual plurality of distinctive code rates. Selection among these rates (which in a typical three indication system may consist of 75 and 180 energy pulses per minute) is made in accordance with advance traffic conditions by the decoding apparatus 10 functioning in customary manner.

This decoding apparatus (details not shown in Fig. 1) is controlled in the usual fashion by the associated track relay TR and it performs the further function of selectively setting up a lighting circuit for one or another of the lamps (G, Y and R in the typical three indication system above referred to) of the wayside signal S at the same location. In the arrangement represented these signal lamps derive energizing current from a power source which is designated by the terminals "plus" and "minus."

For applications in which train carried cab signals (not shown) also are to be controlled, the representative code signaling facilities may still further comprise means at the exit end of the track circuit for additionally supplying the rails thereof with coded alternating current energy. In the form shown at location E in Fig. 1, such means include a tuned alternator TA which at proper times introduces alternating current energy of 100 cycle per second or other suitable carrier wave frequency into the rail supply circuit which coding contact 5 of device TR completes during each "energy on" period of the direct current signal control code from battery TB.

In order that certain functions of the signaling system may be rendered active only upon the approach of a train, the apparatus installed at each of the signal locations D, E etc. is supplemented by an approach relay AR which is arranged to maintain the referred to functions inactive at all times except when the section of track to the rear of the location becomes occupied. In the illustrative arrangement which is shown at location E in Fig. 1, these approach control functions consist in lighting the wayside signal Se (normally dark) and in supplying the rails of the track section to the rear of that signal with coded alternating current energy for cab signal control.

The former function is governed by a contact 9 of the approach relay AR and the latter by a companion contact 11 thereof. Either of these functions may, of course, be controlled individually by the approach relay and it will be apparent, moreover, that signaling functions other than or in addition to those just named may likewise be governed by the same relay.

When applied to coded signaling systems of the conventional character just considered, the improved approach control apparatus herein disclosed renders the relay AR at each signal location responsive to the approach of a train and does this, moreover, without the use of line wires. For each of the signal blocks this approach control apparatus comprises: (1) entrance end facilities which supply the rails of that block with pulses of auxiliary energy which are in step with recurring periods of the signal control code, and (2) exit and facilities which receive these auxiliary pulses from the rails and energize the approach relay AR in step with them.

In the form shown at location D, Fig. 1, the referred to entrance end facilities comprise a battery or other source of auxiliary energy AB, an impulse relay IR for transferring the connection of the track rails 1 and 2 from the track relay TR to battery AB during each "off" period of the received signal control code, and means including a transformer winding 8 for supplying the relay IR with a pulse of pick-up energy at the beginning of each of the named "off" periods.

This relay supply winding 8 may, as shown in Fig. 1, be a part of the usual signaling system decoding transformer DT2 or, as shown in Figs. 2, 3, 5, 6 and 7, it may form a part of a separate relay transformer RT. In either case the transformer (DT or RT) is provided with a primary energizing circuit which is controlled by a contact 12 of the code following track relay TR and which derives energy from a direct current source designated by the terminals "plus" and "minus." Each time that the track relay releases the pole changing action of this contact 12 causes to be induced in the secondary winding 8 a pulse of transformer voltage having the polarity designated by the small arrow and which for convenience will be referred to as "normal." Each time, however, that the track relay picks up the reverse action of the contact 12 causes to be induced in this winding 8 a pulse of transformer voltage of the opposite or "reversed" polarity.

Both half waves of voltage from winding 8 are impressed upon the operating winding of the impulse relay IR. This relay, however, is of the polar type and contact 13 thereof occupies the released position (shown in full lines) as long as the relay remains denergized or receives current of the reversed polarity just described. In that position the contact connects the operating winding of the track relay directly across the track circuit rails 1 and 2.

When, however, relay IR receives from winding 8 the beforementioned pulse of normal polarity energy, it picks up contact 13 and thereby disconnects relay TR from the track rails and connects the auxiliary battery AB thereacross. In this manner each release of the track relay TR causes the impulse relay IR momentarily to transfer the track rail connection from the winding of track relay TR to the output circuit of battery AB. At the same time, each pick-up of the track relay is ineffective for interfering with the normal connection of the rails with the winding of that relay.

In the form shown at location E in Fig. 1, my improved exit end facilities comprises a detector relay KR which responds to pulses of auxiliary energy received over the rails 1 and 2 from battery AB, a circuit controlled by a contact 15 of that relay for energizing the approach relay AR from a local source designated by the terminals "plus" and "minus," and means for making the relay AR sufficiently slow releasing to bridge the intervals between recurrent responses of the detector relay.

This detector relay KR is of the code following type and the operating winding thereof is connected in energy receiving relation with the track rails 1 and 2 only during the "off" periods of the signal control code which contact 5 of device CR produces. The here represented arrangement of devices CR, KR and AR is similar to that disclosed and claimed in a copending application Serial No. 221,317, filed July 26, 1938, by Edward U. Thomas; in this arrangement the first named connection is completed by the coding contact 5 when in its uppermost or "off" period position.

The slow release approach relay AR may be energized in step with the responses of the detector relay KR in any suitable manner. As shown, the contact 15 of the detector relay is directly included in a local direct current energizing circuit for the operating winding of the approach relay. For delaying the release of this relay AR and thereby enabling it to remain continuously picked up as long as its winding receives code step pulses of the named energy, use may, of course, be made of any suitable means such as a snubbing impedance (not shown) or internal design expedients incorporated in the relay. Because of their well-known character, all of the drawing views except Figs. 5 and 6 make no attempt to represent any such means.

The function of the exit end tuned alternator TA which is shown at location E in Fig. 1 is to generate locally from a direct current source the alternating current energy which at times is required for cab signal control. In the form represented this alternator includes a transformer 17 which receives primary energizing current from the direct current terminals "plus" and "minus" through a circuit which is periodically pole changed by a reed type of vibrating member 18.

This member may be of iron or other magnetic material and is designed to have a natural rate of vibration which corresponds to the 100 cycle per second or other desired frequency of the output voltage of the alternator TA. Driving movement is imparted thereto by an electromagnet 19 having an energizing circuit which is completed at point 20 each time that the reed occupies its lowermost position. In this manner the armature is caused to vibrate at its natural rate as long as the driving circuit therefor is connected with a source of energy.

When in its lowermost position the armature sets up a circuit through which current from the referred to direct current source flows in one direction through the right portion of the primary winding of the transformer 17 and when in its uppermost position the reed completes a similar circuit through which current flows in the opposite direction through the left portion of the transformer winding and to the negative supply terminal by way of a mid tap 23. Each complete vibration of the armature 18 thus causes a cycle of alternating current voltage to be induced in the secondary winding of the transformer 17.

In this manner an electromotive force of the 100 cycle or other cab signal control frequency is generated whenever the approach relay AR releases its contact 11 and thereby connects the alternator supply conductor 24 with the "plus" terminal of the local direct current source. Conveniently, this source may take the form of the same local battery (not shown) which supplies lighting current to the signal lamps.

It will be seen, therefore, that in a system of the improved character which is shown in Fig. 1, no line wires whatever are required between signal locations. The control of the wayside signals S is effected through the medium of coded signal control energy transmitted through the track rails 1 and 2 in conventional manner; the control of the approach relays AR is similarly effected through the medium of "off" period pulses of auxiliary energy from battery AB fed forwardly to the section exit; and the supply of the alternating current coded energy for cab signal control is provided through the tuned alternator TA from the track battery TB or other local source of direct current energy.

In operation of the nonline wire approach control facilities which are represented in Fig. 1, the track rails 1 and 2 of section D—E act in the usual manner to transmit energy from one end of the section to the other as long as the section remains unoccupied. Each time, under such conditions, that contact 5 of the coding device CR is in the lowermost or "on" code period position the track battery TB picks up the track relay TR over a circuit which may be traced from the positive terminal of the battery through secondary winding of transformer 17, conductor 26, a current limiting impedance 27, back contact 5 of device CR, conductor 28, track rail 1, conductor 29, the winding of the track relay TR, conductor 31, back contact 13 of relay IR, conductor 32, the track rail 2, and conductor 33 back to the negative terminal of battery TB.

Each time that the coding contact 5 occupies the uppermost or "off" code period position and bridges the winding of the detector relay KR across the track rails, the track relay TR at the entrance end of the section releases and transfers the primary energizing circuit for transformer DT2 from conductor 35 and the upper half of the transformer primary to conductor 36 and the lower half of the primary. This reversal of excitation induces in the secondary winding 8 of the transformer a pulse of normal polarity voltage which is impressed on the winding of the impulse relay IR over a circuit extending from the lower terminal of winding 8 through conductor 37, the winding of relay IR and conductor 38 back to the upper terminal of the transformer secondary.

In responding, contact 13 of relay IR picks up at the beginning of each of the "off" periods of the signal control code and disconnects the winding of relay TR from the track rails and connects the auxiliary battery AB thereacross. Under this condition the battery AB picks up the detector relay KR at the exit end of the section over a circuit which may be traced from the positive terminal of the battery through a current limiting impedance 40, front contact 13 of relay IR, conductor 32, track rail 2, conductor 33, the winding of relay KR, conductor 41, front contact 5 of device CR, conductor 28, track rail 1, and conductors 29 and 42 back to the negative terminal of battery AB.

Under the influence of each of these auxiliary pulses of energy received from the trackway, contact 15 of code following detector relay KR picks up and completes for the approach relay AR a local energizing circuit which may be traced from the positive terminal of a suitable supply source through front contact 15, conductor 43 and the winding of relay AR back to the negative terminal of the supply source.

As a result of these recurring pulses of local energization, the slow release approach relay AR now holds contacts 9 and 11 continuously picked up, thereby maintaining the wayside signal Se and the tuned reed alternator TA at location E deenergized as long as the track section D—E remains vacant.

In the event that a train comes into the track section D—E, the usual shunting action of its wheels and axles reduces to a very low value the potential difference between the rails 1 and 2 and thus deprives both of the relays TR and KR of pick-up energy. Relay KR now remains released continuously and the supply of local energization to the approach relay AR is discontinued. In consequence, contacts 9 and 11 of that relay now complete energizing circuits for signal Se and the tuned reed alternator TA.

As a result the named wayside signal now lights the particular lamp selected by the decoding equipment 10 and the tuned reed alternator TA supplies the rails of track section D—E with a pulse of alternating current energy each time that the contact 5 of device CR occupies its lowermost position. As has been mentioned this energy is suitable for the control of train carried cab signals and the circuit over which it is supplied may be traced from the right terminal of the secondary winding of transformer 17 through conductor 26, impedance 27, back contact 5 of device TR, conductor 28, track rail 1, the wheels and axles (not shown) of the train, rail 2, conductor 33, and track battery TB back to the left terminal of the transformer secondary.

As soon as the rear of the departing train clears the exit of section D—E the coded energy from track battery TB is again transmitted by the rails to the track relay TR at the section entrance. That relay once more responds and the operation of contact 12 thereof causes the impulse relay IR again to connect the track rails in energy receiving relation with the auxiliary battery AB during each of the "off" code periods. These auxiliary energy pulses are, in turn, transmitted by the rails to the detector relay KR at the exit location E.

In responding to them that relay again causes the approach relay AR to receive recurrent pulses of local energizing current. The approach relay once more picks up and due to its slow releasing characteristics continuously deenergizes the wayside signal Se and the tuned reed alternator TA at location E, thereby restoring both of these devices to their normally inactive state.

Further regarding my improved entrance end facilities which are shown at location E, the impulse relay IR and the transformer winding 8 from which it receives pick-up energy are so designed that the relay will pick up contact 13 relatively soon after the beginning of each "off" period of the received signal control code and will maintain this contact picked up until just before the beginning of the "on" period for the particular code wherein the periods are shortest. In the case of the three indication signaling system referred to in an earlier portion of this specification, this limitation in the length of pick-up time for the contact 13 will, of course, be determined by the highest speed or 180 energy pulse per minute code. Such a code has a cycle length of $^{33}/_{100}$ second and an "off" period length of about $^{16}/_{100}$ second.

With this 180 energy pulse per minute code, it is found possible to maintain the impulse relay contact 13 picked up for a total of approximately $^{6}/_{100}$ second during each of the "off" periods. This allows a margin of approximately $^{5}/_{100}$ second from the time that the track relay TR first starts to release until the impulse relay IR fully picks up and a period of approximately the same length from the time that the impulse relay IR starts to release until the track relay picks up at the beginning ofthe next "on" code period. Such a relation assures about the maximum practical time of connection of the auxiliary battery AB with the track rails during each "off" period of the 180 code without producing overlapping or delay in the reconnection of the winding of the track relay TR with the rails until after the beginning of the succeeding "on" period.

As has been pointed out, the impulse relay IR is preferably of a polarized design and may satisfactorily be of a normally quick acting type in both the pick-up and the drop-out directions. Even though the pulse of normal polarity energy supplied through transformer winding 8 at the beginning of the "off" period may be much shorter than the $^{6}/_{100}$ second total time of relay pick-up, the desired delay in release is provided through the snubbing action of the winding 8 which, through conductors 37 and 38, is directly bridged across the terminal of the relay winding.

Once selected to meet the limiting conditions of the highest speed code of the signaling system, the relay IR provides the same fixed period of rail connection transfer for all other codes. That is, even with the lower speed or 75 pulse per minute code previously referred to, the period of rail connection transfer will still be approximately $^{6}/_{100}$ second even though the total length of the 75 code "off" period is of the much extended order of $^{40}/_{100}$ second.

In all cases, however, my entrance end facilities afford an improved means for introducing the pulses of auxiliary energy into the track circuit without interfering with the normal code following operation of the signaling system track relay TR. From a standpoint of energy conservation, these facilities are of special advantage since they maintain the auxiliary energy supply circuit completely disconnected from the track rails during the "on" code periods, and thereby enable the track relay TR to receive the full value of trackway energy available at its point of connection with the rails. Moreover, during each of the "off" code periods, the facilities maintain the track relay TR completely disconnected from the rails and thus allow all of the auxiliary energy from battery AB to be impressed upon the track circuit for the purpose of transmission forwardly to the operating winding of the code following detector relay KR at the section exit.

Considering further my improved exit end facilities which include this detector relay KR and of which the tuned reed alternator TA also forms a part in the arrangement of Fig. 1, the secondary winding of the alternator transformer 17 is designed with a sufficiently low resistance as not to interfere objectionably with the transmission of direct current from the battery TB to the rails 1 and 2. The winding of the detector relay KR, moreover, is connected with the rails only during the "off" code period produced by device CR and in this way it is prevented from diverting from the trackway the coded signal control energy from either or both of the sources TB and TA.

Similarly, since these sources are disconnected from the rails during each "off" period of the code which device CR produces, the circuits thereof do not divert from the operating winding of relay KR the auxiliary energy received over the rails 1 and 2 from the battery AB. In this manner maximum utilization of the different forms of energy for the particular purposes intended is at all times assured.

Preferably, the resistance of the winding of the detector relay KR is kept relatively low in order that the undesirable effects of track storage of the signal control energy from the track battery TB may be counteracted during the "off" code periods when contact 5 connects that winding across the rails. As is known, such energy tends to accumulate in the rails and ballast of each of the signaling system track circuits as a result of the repeated application thereto of the direct current code pulses from the track battery or other direct current source at each section exit. Unless counteracted, the potential appearing between the rails 1 and 2 because of this storage effect may, over a period of time, build up to a value which becomes sufficient even to prevent the signaling system track relay TR at the section entrance from releasing during the "off" periods of the signal control code.

The counteraction of track storage energy which is referred to above results from the low resistance rail discharge path which the winding of relay KR provides during each of the "off" code periods when contact 5 of device CR connects it across the rails 1 and 2. This shunting action assures that the rail potential will be sufficiently reduced at the beginning of each "off" period to enable the entrance end track relay to drop out promptly in the desired manner.

If desired the basic counteracting provision just described may be supplemented by poling the auxiliary battery AB oppositely to the track battery TB. Such an arrangement is shown in Fig. 1 wherein the exit end track battery TB makes rail 1 positive with respect to rail 2 each time it is connected to the rails over coding contact 5, while the entrance end auxiliary battery AB makes rail 2 positive with respect to rail 1 each time that it is connected to the track circuit by transfer contact 13 of the impulse relay IR. Hence, the "off" period pulses of auxiliary energy provide a direct counteracting influence which further reduces the potential of track battery polarity which remains between the track rails following each disconnection of the battery TB therefrom.

Figure 2:
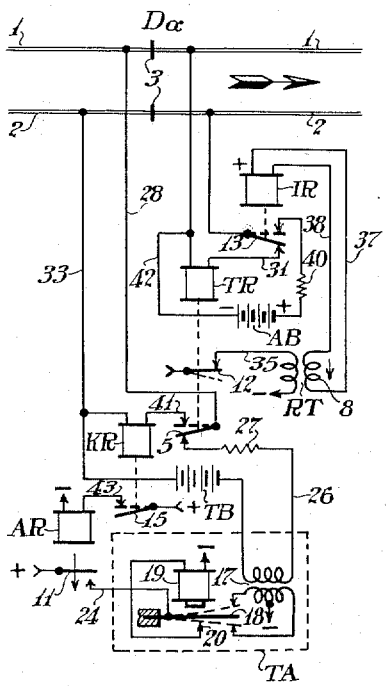
Fig. 2 is a diagrammatic view of cut section facilities which are suitable for use with the approach control scheme of Fig. 1.

Referring to Fig. 2, I have there represented cut section facilities which are suitable for use with the approach control scheme of Fig. 1. These facilities are required when, because of excessive length or for any other reason, it becomes necessary to sub-divide the main signal block length of track into two or more track circuits. In Fig. 2 one location of such a sub-division is designated by the character D*a* and to facilitate explanation it will be assumed that this particular location is constituted by interposing insulated rail joints 3 between the limits D and E of the signal block of Fig. 1.

The facilities of Fig. 2 are arranged to perform three functions. First they repeat the coded direct current signal control energy received from the forward section rails around the joints 3 and into the rails of the section to the rear of location D*a*. Aiding in this first function is a code following track relay TR which is operated by energy received from the forward section rails, a track battery TB which serves as an energizing source for the rails of the rear section, and a coding contact 5 operated by the relay TR and arranged to complete the rail supply circuit for the rear section each time that the track relay TR releases and to interrupt it each time that the relay is picked up.

This arrangement of Fig. 2 employs what will be termed as "back contact coding"—from the fact that each "off" period of the forward section code produces an "on" period in the rear section code while each "on" period of the forward code is accompanied by an "off" period in the rear code. As in the corresponding facilities of Fig. 1, the referred to rail supply circuit of Fig. 2 may be traced from the positive terminal of battery TB through the secondary winding of transformer 17 of the tuned reed alternator TA, conductor 26, impedance 27, back contact 5 of device TR, conductor 28, track rails 1 and 2 and conductor 33 back to the negative terminal of battery TB.

The second function performed by the cut section facilities of Fig. 2 is to introduce the "off" code period pulses of auxiliary energy into the rails of the track section ahead of location D*a*. Participating in this second function is an auxiliary battery AB, an impulse relay IR which (as in Fig. 1) transfers the rail connection from the winding of the track relay TR to battery AB, and a transformer RT which supplies relay IR with a pulse of pick-up energy at the beginning of each "off" code period.

Each time that the track relay TR releases, contact 12 thereof interrupts the direct current exciting circuit for transformer RT and causes winding 8 thereof to supply relay IR with a pulse of normal polarity pick-up energy. Contact 13 now transfers the normal connection of the rails 1 and 2 from the operating winding of relay TR to the terminals of the auxiliary battery AB and thus supplies the auxiliary energy to the trackway in the manner named.

The third function performed by the cut section facilities of Fig. 2 is to supply the rails of the track section to the rear of location D*a* with coded alternating current energy suitable for cab signal control whenever a train enters that rear section. Aiding in this third function is a tuned reed alternator TA, a slow release approach relay AR for connecting this alternator with a direct current supply source over contact 11, and a code following detector relay KR for energizing (over contact 15) the approach relay in step with the pulses of auxiliary or "off" code period energy which are received from the rear section rails.

As long as these pulses continue to be received relay AR is periodically energized, as in the system of Fig. 1, and holds contact 11 picked up to maintain the alternator TA inactive. When, however, a train comes into the rear section, relay KR continuously releases, relay AR becomes deenergized continuously and the alternator then is connected with the direct current operating source over conductor 24 and relay contact 11. Each time, now, that coding contact 5 of relay TR occupies the lowermost position the transformer 17 of the apparatus TA impresses 100 cycle or other cab signal control frequency energy upon the rear section rails 1 and 2 by way of the circuit previously traced as including conductors 28 and 33.

It will thus be seen that the cut section facilities of Fig. 2 may be interposed within the limits of a signal block length of track, such as shown at D—E in Fig. 1, without interfering with the operation either of the main signaling scheme or of the approach control facilities of my invention which are used therewith. If desired (not shown in Fig. 2) the relative polarity of the two track circuits which adjoin at location Da may be staggered for the purpose of providing the usual protection against broken down rail joints.

Figure 3:
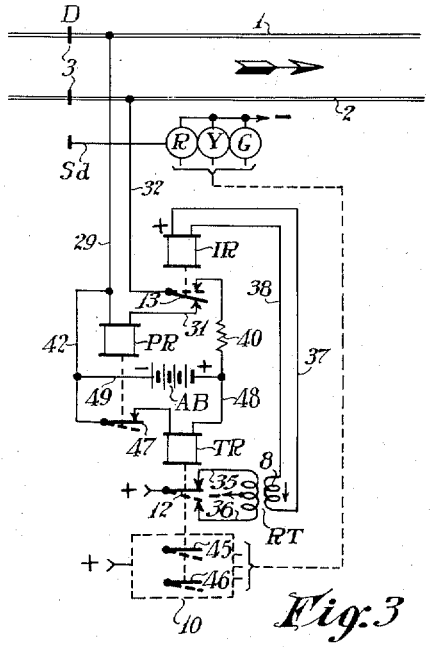
Fig. 3 is a diagram showing entrance end facilities supplemented to increase the length of the track circuit which may be approach controlled without the aid of cut section facilities.

Referring to Fig. 3, I have there shown entrance end facilities modified to extend the length of the track circuit which may be approach controlled by a nonline wire scheme of the type represented in Fig. 1 without resorting to cut section facilities of any kind.

With the basic form of arrangement which is shown at location D in Fig. 1, the track relay TR must be provided with a number of contacts. One such contact is shown at 12 in each of Figs. 1 and 3 and two additional ones are represented at 45 and 46 in Fig. 3. Such additional contacts are occasioned by the previously referred to decoding apparatus 10 one typical form of which is shown in greater detail in Fig. 5. There the contacts 45 and 46 are included in the primary and the secondary circuits of a decoding transformer DT1 by which decoding relays DR75 and DR180 of the signaling system are energized in a manner more completely to be described later.

The effect of this multiplicity of contacts is to cause the track relay TR to require an increased amount of operating energy from the track rails 1 and 2. When the length of the track circuit exceeds say a mile or a mile and a half, difficulty frequently is experienced in transmitting the necessary amount of relay operating energy from the track battery TB at the exit end over the rails 1 and 2 to the track relay TR at the entrance end of the signal block and in the past it has been necessary to resort to cut section facilities (see Fig. 2) for all signal blocks which have lengths of the order of 2 miles or more. This interposed equipment at the cut section adds, of course, to the total cost of the installation and in other respects is considered undesirable.

To make its use unnecessary and to operate the the multi-contact track relay TR by means of the comparatively weak signal control energy which is available at the entrance end of an exceedingly long track circuit, I have provided the extended facilities which are shown in Fig. 3. These include all of the basic portions of equipment which have been described in connection with location D of Fig. 1 and in addition they utilize a pilot relay PR which is interposed between the track rails 1 and 2 and the operating winding of the code following track relay TR.

This pilot relay need not be provided with but a single contact 47 and hence may be designed to pick up on a much smaller intensity of trackway energy than can the multi-contact track relay TR. Relay PR is of the code following type and its operating winding is connected in energy receiving relation with the rails 1 and 2 by way of conductors 29 and 32 and the transfer contact 13 of the impulse relay IR. Each time that the pilot relay is picked up contact 47 thereof completes a local energizing circuit for the operating winding of the associated track relay TR. This circuit may, of course, be supplied from any suitable local source and in the arrangement of Fig. 3 the auxiliary battery AB is utilized for this purpose.

In considering the operation of the extended entrance and facilities of Fig. 3, it will be helpful to assume that the rails 1 and 2 extending forwardly from location D thereof terminate in cooperating exit end facilities of the character represented at E in Fig. 1. During such operation, each pulse of signal control energy which is received from the track rails 1 and 2 picks up the pilot relay PR over a circuit which extends from rail 1 through conductor 29, the winding of relay PR, conductor 31, back contact 13 of relay IR and conductor 32 back to rail 2. In this manner each of the "on" code periods causes contact 47 of relay TR to pick up the track relay TR over a circuit which may be traced from the positive terminal of battery AB through conductor 48, the winding of relay TR, front contact 47 of relay TR, and conductors 42 and 29 back to the negative terminal of battery AB.

Relay TR is thus caused to follow the trackway code in the same manner as were it to be directly connected across the rails 1 and 2 as in Fig. 1. The contact 12 thereof thus causes transformer RT to supply a pulse of normal polarity pick-up voltage to the impulse relay IR at the beginning of each "off" code period. In responding, relay IR picks up contact 13 and thus transfers the track circuit connection from the winding of the pilot relay PR to the output terminals of the auxiliary battery AB. During each period of such connection transfer, this battery supplies the rails with a pulse of auxiliary energy over a circuit which may be traced from the positive terminal of battery AB through conductor 48, impedance 40, front contact 13 of relay IR, conductor 32, the track rails 1 and 2, and conductors 29, 42 and 49 back to the negative terminal of battery AB.

It will thus be seen that insofar as the coded signaling system and the associated approach control without line wire scheme are concerned, the extended facilities of Fig. 3 are the full equivalent of the basic form of apparatus shown at location D in Fig. 1. As has been pointed out, however, the Fig. 3 equipment has the added advantage of making possible the approach control of track circuits of two miles or greater length without the use of cut section facilities of any kind.

Figure 4:
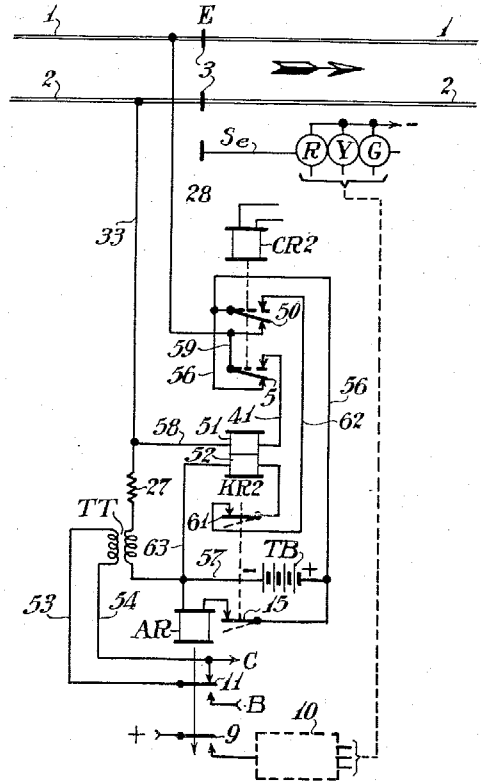
Fig. 4 is a similar representation of exit end facilities which include provision for a double functioning of the contacts of the signaling system coding device.

Referring now to Fig. 4, I have there represented an extended form of exit end facilities which may be substituted for the previously described exit end apparatus which is represented at location E in Fig. 1. As in Fig. 1, the apparatus of Fig. 4 employs coding, detecting and approach relay devices CR, KR and AR. It differs, however, in that the continuously operating coding device CR2 is provided not only with the main coding contact 5 but also with a second contact 50. Likewise, the detector relay designated at KR2 in Fig. 4 has not only the Fig. 1 pick-up winding 51 which contact 5 bridges across the track rails during the "off" periods of the signal control code, but also a second or "stick" winding 52 arranged in the manner disclosed and claimed by the before referred to copending application Serial No. 221,317 of Edward U. Thomas (filed July 26, 1938).

The purpose of this added or stick winding is to make possible a reduction in the period of delay of the approach relay AR in releasing its contacts 9 and 11 following each prolonged interruption of its energizing circuit at contact 15 of the detector relay KR2. As is more completely described in the copending application just mentioned, use of a detector relay having such a stick winding quickens the response of the approach control relay AR to the entry of a train into the associated track section and thus avoids objectionable "flips" in the cab signals of a train when that train first passes over the insulated rail joints 3 at the section entrance.

As shown in Fig. 4, the track battery TB is used as the source of energization for the operating winding of the approach relay AR. Moreover, the facilities for supplying the rails with coded alternating current energy for cab signal control are modified to the extent that the tuned alternator represented at TA in each of Figs. 1 and 2 is replaced by a track transformer TT having a secondary winding which is serially included in the rail supply circuit of which battery TB forms a part. At proper times the primary winding of this transformer is energized over a conductor 53 from a suitable alternating current source designated by the terminals B and C.

With such an arrangement, of course, it is imperative that an alternating current transmission line be provided along the right-of-way for the purpose of distributing the alternating current energy to each of the signal locations of which E of Fig. 4 is representative. As already pointed out, the use of the tuned alternator TA as in Fig. 1 eliminates the need for such a line and allows all of the signal control and approach governing functions to be carried out without line wires of any kind and by the aid of energy derived from the locally installed track and auxiliary batteries TB and AB.

For lowering the impedance which the secondary winding of transformer TT introduces into the rail supply circuit under inactive transformer conditions, the contact 11 of the approach relay AR preferably is arranged (as shown in Figs. 4, 6, 7 and 8) to short circuit the primary winding of the transformer whenever the approach relay is picked up. Thus, whenever the track section to the rear of the location is vacant, this primary shunting path is completed from the lower terminal of the primary of transformer TT through conductor 54, front contact 11 of the relay AR, and the conductor 63 back to the upper terminal of the transformer primary.

In operation of the extended exit end facilities of Fig. 4, both of the contacts 5 and 50 of the coding device CR2 function in parallel in making and breaking the circuit through which the track rails 1 and 2 receive energy from the track battery TB, and also the track transformer TT under certain conditions. Each time that the contacts occupy the lowermost position (shown in full lines), the rails are connected with the battery TB over a circuit which may be traced from the positive supply terminal of that battery through conductor 56, contacts 5 and 50 in parallel, conductors 59 and 28, the track rails 1 and 2, conductor 33, impedance 27, the secondary of transformer TT and conductor 57 back to the negative terminal of the track battery.

Each time that the contacts 5 and 50 occupy the uppermost or "off" code period position, contact 5 connects the pick-up winding 51 of the detector relay KR2 with the track rails and thus conditions it for receiving auxiliary energy therefrom over a circuit which extends from rail 2 through conductors 33 and 58, the relay winding 51, conductor 41, front contact 5 of device CR2 and the conductors 59 and 28 back to the track rail 1. This auxiliary energy, when received, comes from the approach battery AB of entrance end facilities of the character which are represented at location D in Fig. 1. In considering the operation of Fig. 4, it will be helpful to assume that the rails 1 and 2 extending rearwardly from location E thereof terminate in facilities of the character represented at D in Fig. 1.

In the "off" code position the second contact 50 of the coding device CR2 completes for the stick winding 52 of the detector relay KR2 a stick circuit which was set up by a contact 61 of the detector relay when that relay became picked up by the pulse of auxiliary energy which circulated through the pick-up winding 51. This stick circuit functions to continue the pick-up of relay KR2 for the full duration of the "off" code period and it may be traced from the positive terminal of the track battery TB through conductor 56, front contact 50 of device CR2, conductor 62, front contact 61 of relay KR2, the winding 52 of that relay, and conductors 63 and 57 back to the negative terminal of battery TB.

In this manner each pulse of auxiliary energy received from the rear during an "off" code period picks up the detector relay KR2 and causes that relay to remain picked up until contact 50 of coding device CR2 is returned to the lowermost position at the beginning of the succeeding "on" code period. As long as the track section to the rear of location E remains vacant, therefore, relay KR2 responds in this manner during each "off" period and causes contact 15 thereof periodically to complete for the slow release approach relay AR an energizing circuit which may be traced from the positive terminal of battery TB through conductor 56, front contact 15, the winding of relay AR and conductors 63 and 57 back to the negative terminal of the track battery.

Because of its slow release characteristics the approach relay AR now holds its contacts 9 and 11 picked up continuously and thus maintains the wayside signal *Se* and the track transformer TT at location E in their normally inactive condition.

Upon the entry of a train into the section to the rear of Fig. 4 location E, the supply of the auxiliary energy to the detector relay KR2 is cut off due to the usual shunting action of the train wheels and axles. The detector relay now remains released continuously, relay AR is deenergized continuously, and it releases contacts 9 and 11, thereby completing the lighting circuit for the wayside signal *Se* and connecting the primary winding of the track transformer TT with the alternating current source B—C.

Each time, now, that the contacts of coding device CR2 are in the lowermost or "on" code position the secondary winding of this transformer supplies the track rails with a pulse of alternating current energy by way of a circuit which may be traced from the lower terminal of the transformer secondary through conductor 57, the track battery TB, conductor 56, contacts 5 and 50 of device CR2 in parallel, conductors 59 and 28, track rail 1, the wheels and axles (not shown) of the train, rail 2, conductor 33 and impedance 27 back to the upper terminal of the transformer secondary.

As soon as the rear of the departing train clears the exit end location E, the supply of "off" period pulses of auxiliary energy to the pick-up winding 51 of the detector relay KR2 is resumed, this relay responds and recurrently completes at contact 15 the energizing circuit for the slow release approach relay AR, and that relay once more picks up thereby interrupting at contact 9 the lighting circuit for the wayside signal *Se* and disconnecting at contact 11 the track transformer TT from the alternating current source B—C.

Figure 5:
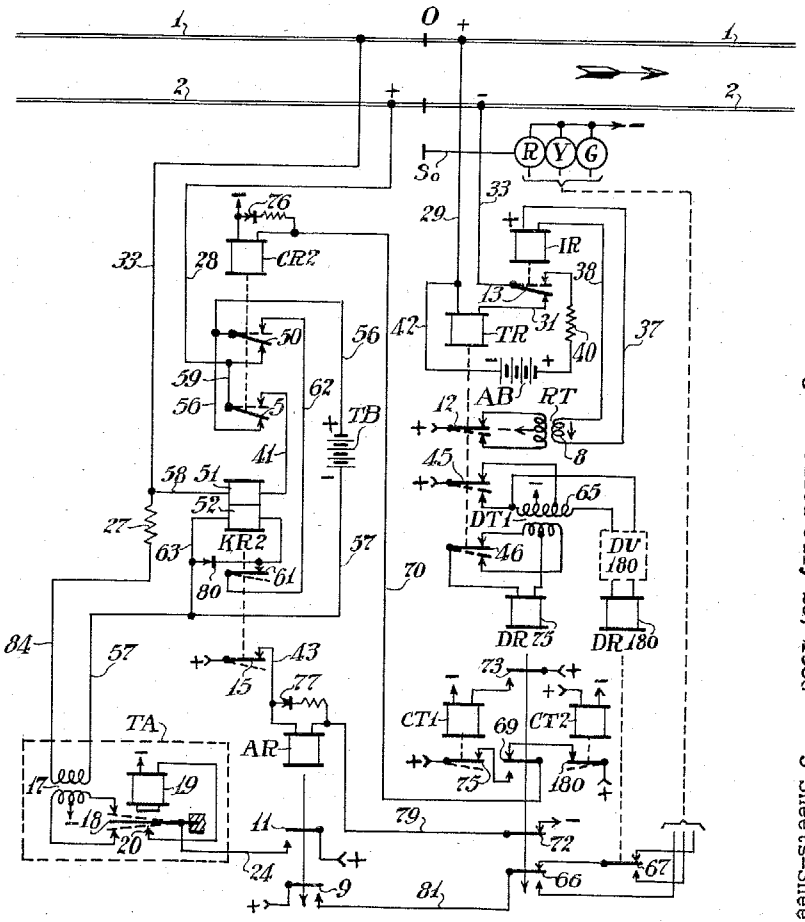

Referring to Fig. 5, I have there represented the equipment at a single signal location O for a coded track circuit system of automatic block signaling which provides three indication signal control through the use of the 75 and 180 pulse per minute trackway codes previously referred to and which is equipped with the improved approach control facilities herein disclosed. Unlike the earlier views, Fig. 5 represents in relatively complete manner one representative form which the signaling system decoding apparatus (indicated at 10 in Figs. 1, 3 and 4) may take.

This decoding apparatus of Fig. 5 includes a decoding transformer DT1 provided with a direct current primary exciting circuit which is pole changed in conventional manner by a contact 45 of the code following track relay TR. The secondary winding of this transformer is connected in energy supplying relation with a first decoding relay DR75 over a circuit which includes a second or current rectifying contact 46 of the track relay. Deriving energy from the exciting circuit of the decoding transformer through a circuit which includes an extended section 65 of the primary winding is a second decoding relay DR180.

This second decoding relay is rendered responsive only to energizing voltages from transformer DT1 which have a frequency corresponding to that produced when the track relay TR receives operating energy of the 180 pulse per minute code. In the particular arrangement shown, this selective action is provided through the use of a resonant unit DU180 included in the supply circuit of relay DR180 in well-known manner.

The first decoding relay DR75 is non-selective and is adapted to pick up when the track relay TR responds to operating energy of either the 75 or the 180 trackway codes. It is a direct current device and is associated with the decoding transformer DT1 in a manner disclosed and claimed in copending application Serial No. 210,744, filed by Frank H. Nicholson et al. on May 28, 1938, and assigned to The Union Switch & Signal Co.

Through the medium of contacts 66 and 67 the two decoding relays DR75 and DR180 control the lighting circuits for the three lamps G, Y and R of the associated wayside signal So. When relay TR responds to energy of the 180 code received from the track section ahead of location O, both of the relay DR75 and DR180 are picked up to set up the lighting circuit for the "clear" lamp G. When this relay responds to energy of the 75 pulse per minute code, relay DR75 only is picked up and the lighting circuit for the "approach" lamp Y is then set up. Finally when relay TR is continuously deenergized, as when a train is in the track section ahead of location O, both of the decoding relays DR75 and DR180 are released and the circuit for the "stop" lamp R is thus set up.

For supplying the track rails with the coded energy already mentioned, the signaling system facilities of Fig. 5 make use of a pair of code transmitters CT1 and CT2. Device CT1 is provided with a contact 75 which operates at the rate of 75 times per minute while device CT2 is provided with a similar coding contact 180 which operates at the higher speed of 180 times per minute. At all times one or the other of these two coding contacts is included in the operating circuit of the coding relay CR2 for the rear signal block.

Selection between the two signal codes is made through the medium of a contact 69 of the decoding relay DR75. When energy of either the 75 or the 180 energy pulse per minute code is received from the forward section by relay TR this contact 69 is picked up and the coding relay CR2 for the rear section then is intermittently energized over a circuit which includes coding contact 180 of device CT2 and which may be traced from the positive terminal of a suitable supply source through coding contact 180 (in the uppermost position), front contact 69 of relay DR75, conductor 70, and the winding of relay CR2 back to the negative terminal of the supply source.

When no forward section energy is received by the track relay TR, contact 69 of relay DR75 is released and the coding relay CR2 for the rear section then is controlled by coding contact 75 by way of a circuit which may be traced from the positive supply terminal through coding contact 75 (in its uppermost position), back contact 69 of relay DR75, conductor 70 and the winding of relay CR2 back to the negative supply terminal.

In the manner already explained in connection with Fig. 4, contacts 5 and 50 of the coding relay CR2 complete a circuit over which the rear section rails are supplied with direct current energy from track battery TB each time that the contacts are in the lowermost position and these same contacts respectively set up the pick-up and stick circuits for the detector relay KR2 each time that they are in the uppermost position. As in Fig. 4 also, the energizing circuit for the slow release approach relay AR at the signal location is controlled by contact 15 of the detector relay KR2.

Completion of this circuit, however, is conditioned upon a contact 72 of the decoding relay DR75 being picked up and connecting conductor 79 with the negative supply terminal. This means that the relay AR must remain released at all times that a train is in the section ahead of location O of Fig. 5 regardless of whether a second train is or is not approaching the location from the rear. When controlled over back contact 9 of relay AR in the manner shown, this insures that the lighting circuit for the wayside signal So can never be interrupted until the forward moving train has cleared the exit end of the forward section referred to.

In the arrangement of Fig. 5, moreover, the 180 code transmitter CT2 of Fig. 5 operates continuously while the 75 code transmitter CT 1 receives operating current only when a contact 73 of the decoding relay CR75 is released. Since this release takes place only when the section of track in advance of location O is occupied, the represented use of contact 73 assures that coder CT1 will be placed in operation only when needed.

For assisting in the correction of code distortion in the rear track circuit, the coding relay CR2 is provided with a snubbing circuit 76 which tends to prolong somewhat the time that the contacts 5 and 6 remain in the uppermost or "off" period position during each code cycle. As shown in Fig. 5, furthermore, the approach relay AR is provided with a comparable snubbing circuit 77. It, however, performs only the before explained function of causing the relay AR to be sufficiently slow releasing to bridge the periods between recurrent responses of the detector relay KR2 when the section of track to the rear of location O is vacant.

For supplying the rear section rails with alternating current energy for cab signal control, the equipment of Fig. 5 makes use of a tuned alternator TA which functions in the manner already described in connection with Figs. 1 and 2. The output terminals of this alternator replace the track transformer TT of Fig. 4 and operation of the alternator is controlled by contact 11 of the approach relay AR which when released connects the alternator input conductor 24 with the positive terminal of a suitable local direct current supply source.

In operation of the equipment shown in Fig. 5, the signaling system portions thereof function in conventional manner while the approach control portions thereof operate in a way which is comparable to that already explained in connection with earlier figures of the drawings. Hence, it will suffice to point out that as long as the protected stretch of track 1—2 remains vacant the exit end facilities for each section supply the rails thereof with energy of the 180 coding, the entrance end track relay TR for each section responds to this energy, the associated decoding relays DR75 and DR180 at each signal location are both picked up, the "clear" lamp G of the controlled wayside signal S has its lighting circuit set up and contact 180 of device CT2 is included in the energizing circuit of the coding relay CR2 for the track section to the rear.

Each release of the track relay TR causes the impulse relay IR to pick up and momentarily connect the auxiliary battery AB with the section rails. At the exit end of the section these auxiliary energy pulses pick up the detector relay KR2 in step therewith, it recurrently completes the energizing circuit for the slow release approach relay AR and that relay, in turn, maintains the wayside signal S dark and keeps the tuned reed alternator TA inactive.

For prolonging the hold up time of detector relay KR2 slightly beyond the instant at which the coding contact 50 of device CR2 starts to move downwardly at the end of each "off" code period, the stick winding 52 of the relay is provided with a snubbing element 80. This element is shown in the form of a rectifier which is so poled that it does not interfere with the normal supply of current to the winding 52 but yet does provide a path for discharge current incident to the collapse of flux in the magnetic circuit of the relay following the disconnection of the winding from its supply source.

The before stated effect of the snubbing element is to prolong the hold up time of the contacts of the relay KR2 at least until the contact of device CR2 has reached the lowermost position and thus connected the tracks rails 1 and 2 of the rear section with the track battery TB. In some instances the hold up time may be even further prolonged until the track rails begin to transmit auxiliary energy from the entrance end battery AB forwardly and over front contact 5 of device CR2 to the pick-up winding 51 of relay KR2 at the section exit. In any case this extension of hold up time reduces the amount of release delay with which the approach relay AR must be provided and thus has the practical effect of quickening the response of that relay to the entry of a train into the section.

In the event that a train approaches the signal location O of Fig. 5, the shunting action of its wheels and axles deprives the detector relay KR2 of the pick-up pulses of auxiliary energy and allows it to release its contacts continuously. Now continuously deenergized, relay AR releases and contact 9 thereof completes the before set up lighting circuit for the lamp G of the wayside signal So. At the same time contact 11 of relay KR completes the operating circuit for the tuned alternator TA and thus causes transformer 17 to generate an output voltage of the 100 cycle per second or other cab signal control frequency.

Each time now that the contacts 5 and 50 of the coding device CR2 are in the lowermost position this transformer 17 supplies the rails with alternating current energy over a circuit which extends from the right terminal of the transformer secondary through conductor 57, the track battery TB, conductor 56, coding contacts 5 and 15 in parallel, conductors 59 and 28, track rail 2, the train wheels and axles (not shown), track rail 1, conductor 33, impedance 27 and conductor 84 back to the left terminal of the transformer secondary. This alternating current energy is superimposed upon the direct current signal control energy from track battery TB which under all conditions reaches the rails by way of a circuit extending from the positive terminal of the battery, through conductor 56, back contacts 5 and 50 in parallel of coding relay CR2, conductors 59 and 28, the rails 1 and 2, conductor 33, impedance 27, conductor 84, the secondary of transformer 17 and conductor 57 back to the negative terminal of battery TB.

The two approach controlled signaling functions above discussed continue active until the rear of the departing train clears the location O. When that happens the rails 1 and 2 once more transmit auxiliary energy to the pick-up winding 51 of the detector relay KR2, that relay restores the recurrent energization of the approach relay AR, and it in turn picks up contacts 9 and 11 to return the wayside signal So and the tuned alternator TA to their normally inactive condition.

In the event that a second train approaches location O from the rear before the first train has moved out of the track section ahead of this location, the cycle of operations just described will be repeated with the single difference that instead of operating at the 180 pulse per minute rate the coding device CR2 will be operating at the 75 pulse per minute rate. This means that prior to the entry of the second train into the rear section the "off" period pulses of auxiliary energy are supplied at a considerably slower rate of recurrence than under the 180 code conditions previously described. However, the combined action of the stick and release delay circuits for the detector relay KR2 prolong each of the pick-up periods thereof until after the end of each of these "off" code periods, thus reducing to somewhat less than the "on" periods of the 75 code the time between recurrent pulses of energization which are supplied to the approach relay AR over contact 15.

As already stated, this relay AR is designed to have a slowness of release which is adequate to bridge this maximum spacing interval. Under the particular conditions assumed, however, the relay does not pick up for the reason that as long as the forward train continues in the section ahead of location O and releases decoding relay CR75, contact 72 of that relay interrupts the energizing circuit for the approach relay and thus insures that the two approach controlled functions already named will be continued active.

In other words, the arrangement of Fig. 5 so operates that until the rear of the forward train clears the exit end of the section of which location O marks the entrance, the approach relay AR remains deenergized even though the detector relay KR2 responds in normal manner to the return pulses of auxiliary energy which are received from the rear section rails. As soon however, as the advance train does clear the forward section, the coding relay DR75 picks up contact 72 and relay AR then becomes subject solely to the control of the contact 15 of the detector relay KR2.

It will further be noted that in the representation of Fig. 5 the polarities of the forward and the rear track sections are staggered. This staggering is for the purpose of providing the usual protection against broken down rail joints in conventional manner. As has already been pointed out, however, the improved approach control facilities herein disclosed are operable with signaling systems which both do and do not employ staggered polarities of adjacent track circuits.

Referring to Fig. 6, I have there represented a single signal location Q of a coded track circuit signaling system which employs decoding apparatus of a somewhat different form and with which the approach control facilities just described in connection with Fig. 5 are combined. As in the equipments of the earlier figures, this signaling system is of the three indication type and it employs two different signal control codes produced by devices CT1 and CT2 and respectively consisting of 75 and 180 energy pulses per minute.

As in the case of Fig. 5, the decoding equipment of Fig. 6 includes first and second decoding relays DR75 and DR180 which respectively respond to both of the 180 and the 75 pulse per minute trackway codes and to the 180 code only. Decoding relay DR180 is connected to receive energy through a resonant or frequency selective unit DU180 and from a transformer DT. This transformer is excited from any suitable direct current source over a pole changing contact 45 of the code following track relay TR and by way of a circuit which includes a conductor 86 and a front contact 73 of the first decoding relay DR75.

When arranged in the manner shown, this contact 73 disconnects the transformer DT from its supply source whenever the track relay TR fails to respond to a trackway code, as when the track section ahead of location Q is occupied by a train. The same contact, moreover, renders the 75 code transmitter CT1 inactive at all times that the named forward section is vacant.

The companion decoding relay DR75 of Fig. 6 is controlled by a contact 46 of the track relay TR, which contact acts in cooperation with an associated repeater relay FP. Both of the devices DR75 and FP are slow releasing. As long as the track relay follows a code of the 75 pulse per minute or higher rate, recurrent pulses of energizing current from a local direct current source are supplied to both the named relays. In the case of relay FP the circuit is completed by contact 46 when picked up and in the case of relay DR75 the circuit is completed only when contact 46 is released.

This latter circuit includes a front contact 87 of the repeater relay FP arranged to insure that a continuously maintained condition of the track relay TR, either released or picked up, can never cause decoding relay DR75 to respond. When, however, the track relay operates contact 46 in code following manner, the slow release repeater relay FP holds contact 87 picked up and thereby enables each release of contact 46 to complete the energizing circuit for the decoding relay just named. In this manner, that relay DR75 picks up only when the track relay TR responds to coded energy of the 75 pulse per minute or higher rate.

As in the system of Fig. 5, the two decoding relays DR75 and DR180 of Fig. 6 are provided with contacts 66 and 67 which control the wayside signal S at the same location. Moreover, relay DR75 is provided with a contact 69 which selects which of the two code transmitters CT1 and CT2 is to control the energizing circuit for the associated coding relay CR2. This relay may or may not be provided with the snubbing facilities which are represented at 76 in Fig. 5.

A further point of difference between the equipments of Figs. 6 and 5 is that in Fig. 6 a track transformer TT and a continuously available supply B—C of alternating current energy are employed for providing the cab signal control code. In the form represented these particular facilities are a duplicate of those of corresponding designations which are represented in Fig. 4 and for this reason further description is not required.

The mode of operation of the approach control facilities which are represented in Fig. 6 in association with the just described signaling system decoding apparatus is so closely a duplicate of that already described in connection with the equivalent equipment of Fig. 5 as to require no further detailed description here.

Referring to Fig. 7, I have there represented cut section facilities which are suitable for use with the approach control apparatus of the earlier described figures. Typically, as already explained, such facilities will be used when the main signal block length of track is, because of excessive length or for other reasons, divided into two track circuit sections. In Fig. 7 the junction of one point of such division is indicated at *Qa*.

As in the case of the corresponding cut section facilities of Fig. 2, those represented in Fig. 7 perform three functions. First they repeat around the insulated joints 3 and into the rails of the section to the rear of the cut the coded track circuit energy which is received from the rails of the forward section. Effecting this first function is a code following track relay TR2 which is operated by energy received from the forward rails, a track battery TB which serves as an energizing source for the rails of the rear section, and coding contacts 5 and 50 which complete the rear section supply circuit each time that the relay TR2 is picked up.

These coding contacts 5 and 50 correspond to the similarly identified members of each of Figs. 4, 5 and 6 and they differ therefrom in that they form a part of relay TR2 rather than of relay CR2 and in that the rail supply circuit is completed when the contacts are in the uppermost rather than the lowermost position. In that event battery TB supplies the rails with current over a circuit which extends from the positive terminal of the battery through conductor 56, front contact 5 of device CR2, conductor 28, track rail 2, rail 1, conductor 33, impedance 27, the secondary winding of the track transformer TT, and conductor 57 back to the negative terminal of the battery TB. In this manner each "on" period of signal control code received from the forward section is repeated as an "on" period into the rails of the rear section and each "off"

period of the forward code is accompanied by an "off" period of the rear section code. This arrangement will be referred to as "front contact coding."

The second function performed by the cut section facilities of Fig. 7 is to supply the forward section rails with a pulse of auxiliary energy during each "off" period of the code to which relay TR2 responds. Participating in this second function is a source of auxiliary energy AB, an impulse relay IR which transfers the track circuit connection from the operating winding of relay TRR2 to battery AB, and a transformer RT which supplies relay IR with pick-up energy each time that contact 12 of relay TR2 releases. These devices cooperate in the manner already explained in connection with Fig. 2 to perform the second function named.

The third function performed by the cut section facilities of Fig. 7 is to supply the rails of the rear section with coded alternating current energy suitable for cab signal control whenever a train enters that rear section. Aiding in this third function is a track transformer TT, a supply circuit therefor including terminals B and C and controlled by contact 11 of a slow release approach relay AR, and means including a contact 15 of a detector relay KR2 for energizing relay AR in step with the pulses of auxiliary energy which are received from the rear section rails.

As long as these pulses continue to be received relay AR is periodically energized in the manner already explained in connection with Figs. 4, 5 and 6, and contact 11 thereof then remains picked up to maintain transformer TT inactive. When, however, a train comes into the rear section, relay RR continuously releases, relay AR is continuously deenergized, and contact 11 thereof now releases to connect transformer TT with the alternating current source B—C and thus cause coding contact 5 of device CR2 to impress the output of transformer TT upon the rear section rails each time that the contact is in its uppermost position.

When in its lowermost position this same contact connects the pick-up winding 51 of the detector relay KR2 in energy receiving relation with the track rails. Likewise, when the second contact 50 of device CR2 is in the lowermost position it sets up for the stick winding 52 of the relay KR2 an energizing circuit which is completed when contact 61 of the same relay becomes picked up. Since the manner in which this detector relay KR2 responds is no different than that in the earlier described figures, no further description need be given here.

It will thus be seen that the cut section facilities of Fig. 7 may be interposed within the limits of a signal block length of track without interfering with the operation either of the main signaling scheme or of the improved approach control system of my invention which is used therewith. As shown in Fig. 7, the relative polarities of the two there adjoining track circuits are staggered for the purpose of providing the usual protection against broken down rail joints.

Referring to Fig. 8, I have there represented cut section facilities which are a duplicate of those shown in Fig. 7 with the exception that they are modified to provide "back contact coding" instead of the "front contact coding." Here the supply circuit for the rear section rails is completed when the contacts 5 and 50 of device CR2 are in the released position and the circuit is interrupted when the contacts are picked up. This means that each "on" period of the forward section code produces an "off" period in the rear section code and that each "off" period of the forward section code is accompanied by an "on" period in the rear section code.

The advantage of this "back contact coding" is that it compensates for distortion of the track circuit code which accompanies its transmission along the length of the track circuit. The tendency of this distortion is to lengthen the "off" periods and shorten the "on" periods and by repeating the coded energy around the insulated joints 3 (see Fig. 7) over the back contact of the track relay TR2 in the manner shown in Fig. 8, the abnormally long "off" periods are not amplified but instead are converted into correspondingly longer "on" periods in the rear section. By the time these have been transmitted to the exit end of the rear section the distorting influence before referred to has a tendency to reduce them to the desired condition of equality.

From the foregoing it will be seen that I have made important improvements in that scheme of approach control without line wires wherein the rails of each unoccupied signal block length of track transmit code step pulses of auxiliary energy forwardly from the block entrance to effect the energization of a slow release approach relay at the block exit.

In particular, I have made provision for supplying the referred to pulses of auxiliary energy to the entrance end of each track circuit in an improved manner which does not interfere with the normal code following operation of the associated signaling system track relay and which eliminates all wastage of power at the location of that relay; I have also made provision for receiving these pulses at the exit end of the signal block and for energizing the slow release approach relay in step with them in an improved manner which quickens the response of that relay to the entry of a train into the signal block; I have further extended the length of the track circuit which the nonline wire apparatus is capable of approach controlling without the aid of cut section facilities; I have additionally provided for a double functioning of the contacts of the track circuit coding devices in their control of the combined signaling and approach governing equipment which is installed at the exit end of each signal block; and still further, I have provided cut section facilities which are suitable for use with approach control means of the improved type herein disclosed.

As all of these improvements are entirely a function of the track circuit and apparatus which is directly associated therewith, they are independent of the coding and decoding facilities of the coding signaling system and hence are usable with a wide variety of different types and forms of such facilities.

While I have explained my invention in an application wherein both the lamps of the wayside signal and the supply of alternating current cab signal energy are approach controlled, it will be understood that either one of these functions may be performed separately and that other comparable functions may also be provided for in my new system.

Although I have herein shown and described only a few forms of approach control apparatus embodying my invention, it is understood that various changes and modifications may be made therein within the scope of the appended claims without departing from the spirit and scope of my invention.

Having thus described my invention, what I claim is:

1. In combination with a section of track to the rails of which coded signal control energy consisting of alternate "on" and "off" periods is continuously supplied at the section exit and from the said rails of which operating energy is received by a code following track relay at the section entrance, approach control facilities comprising a source of auxiliary energy, means governed by said track relay for disconnecting said rails from the operating winding of that relay and for connecting them with said auxiliary energy source during each of the said "off" periods of the signal control code which is received by the track relay whereby those rails are supplied with a pulse of auxiliary energy upon the occasion of each of said connections, a slow release approach relay at the section exit, means for energizing said approach relay in step with the said pulses of auxiliary energy which are received from said rails at the said section exit whereby to maintain that relay continuously picked up as long as said section is unoccupied, and traffic controlling apparatus governed by said approach relay and rendered active when that relay releases in response to the presence of a train in said section.

2. In combination with a section of track to the rails of which coded signal control energy consisting of alternate "on" and "off" periods is continuously supplied and with the said rails of which the operating winding of a code following track relay is connected, approach control facilities comprising a source of auxiliary energy, means governed by said track relay for transferring said track rail connection from the operating winding of that relay to said auxiliary energy source at the beginning of each of the said "off" periods of the received signal control code and for returning that connection to the track relay winding before the beginning of the next "on" period of that code whereby to cause said rails to be supplied with a pulse of auxiliary energy during each of those "off" periods, a slow release approach relay installed at the section exit and energized in step with the said pulses of auxiliary energy which are there received from the section rails whereby to be maintained continuously picked up as long as said section is vacant and to release when a train comes into the section, and traffic governing apparatus controlled by said approach relay.

3. In a railway signaling system which includes a section of track to the rails of which coded track circuit energy consisting of alternate "on" and "off" periods is continuously supplied and from the said rails of which operating energy is received by a code following track relay at the section entrance, the combination of approach control facilities comprising a source of auxiliary energy, an impulse relay effective when energized to disconnect the rails of said section from the operating winding of the track relay and to connect them with said auxiliary energy source whereby to cause said rails then to receive a pulse of auxiliary energy, means controlled by said track relay for energizing said impulse relay at the beginning of each of the said "off" periods of the received track circuit code, a slow release approach relay installed at the exit end of the section and energized in step with the said pulses of auxiliary energy which are there received from the section rails whereby to be maintained continuously picked up as long as said section is vacant and to release when a train comes into the section, and traffic governing apparatus controlled by said approach relay.

4. In combination, a section of railway track, means for supplying coded energy to the rails of said section, a code following track relay having an operating winding connected with said rails, a source of auxiliary energy, an impulse relay for transferring the track rail connection from said track relay winding to said auxiliary energy source, means controlled by said track relay for momentarily energizing said impulse relay each time that the track relay releases whereby to cause said rails then to receive a pulse auxiliary energy, a slow release approach relay energized in step with the said pulses of auxiliary energy which are received from the section rails whereby to be maintained continuously picked up as long as said section is vacant and to release when a train comes into the section, and traffic governing apparatus controlled by said approach relay.

5. In combination with a section of railway track which forms a part of a railway signaling system of the coded track circuit class, approach control facilities comprising a source of trackway energy at the exit end of the section, an approach governing relay also located at the section exit, a coding contact which repeatedly connects the rails of said section first to said trackway energy source and then to said approach governing relay and thereby produces a trackway code consisting of alternate "on" and "off" periods the latter of which coincide with said approach governing relay connections, a code following track relay located at the entrance end of the section and having an operating winding which is connected with said rails, a source of auxiliary energy also located at said section entrance, means controlled by said track relay for disconnecting the section rails from said operating winding of the track relay and for connecting them with said auxiliary energy source during each of the said "off" periods of said trackway code which is received by the track relay whereby to cause said rails to receive a pulse of auxiliary energy during each of those "off" periods and to transmit that pulse forwardly to said approach governing relay at the section exit, and traffic governing apparatus controlled by said approach governing relay and rendered active when and only when that relay is deprived of said recurring pulses of auxiliary energy by the rail shunting action of a train within said section.

6. In combination with a section of track to the rails of which coded signal control energy consisting of alternate "on" and "off" periods is continuously supplied and with the said rails of which a code following track relay is connected, approach control facilities comprising a source of auxiliary energy, means governed by said track relay for transferring said track rail connection from the operating winding of that relay to said auxiliary energy source at the beginning of each of the said "off" periods of the received signal control code and for returning that connection to the track relay winding before the beginning of the succeeding "on" period of that code whereby to cause said rails to be supplied with a pulse of auxiliary energy during each of those "off" periods, and traffic controlling apparatus at the exit end of said section governed by said code step pulses of auxiliary energy and rendered inactive as long as those pulses are there received from said rails.

7. In a railway signaling system which includes a section of track to the rails of which coded signal control energy consisting of alternate "on" and "off" periods is continuously supplied and with the said rails of which a code following track relay is connected, the combination of: means at the entrance end of said section for supplying a pulse of auxiliary energy to said rails during each of the said "off" periods of the signal control code which is received by the track relay comprising a source of auxiliary energy, an impulse relay effective when energized to disconnect the section rails from said track relay and to connect them with said auxiliary energy source whereby to cause those rails then to receive a pulse of auxiliary energy, and means controlled by said track relay for momentarily energizing said impulse relay at the beginning of each of said "off" code periods; and traffic controlling apparatus at the exit end of said section governed by said code step pulses of auxiliary energy which are transmitted thereto over said rails and rendered inactive as long as said transmission of those pulses continues.

8. In combination with a section of track to the rails of which coded signal control energy consisting of alternate "on" and "off" periods is continuously supplied and with the said rails of which a code following track relay is connected, approach control facilities comprising a source of auxiliary energy, an impulse relay effective when energized to transfer said track rail connection from said track relay to said auxiliary energy source, a transformer connected in energy supplying relation with said impulse relay, a direct current exciting circuit for said transformer which is controlled by a contact of said track relay in such manner that that transformer supplies a momentary pulse of pick-up energy to said impulse relay at the beginning of each of the said "off" periods of the received signal control code and thereby causes said section rails then to receive a pulse of auxiliary energy, and traffic controlling apparatus at the exit end of said section governed by said code step pulses of auxiliary energy which are there received from said rails.

9. In combination, a section of railway track, means for supplying coded signal control energy to the rails of said section, a code following track relay having an operating winding which is connected with said rails, a source of auxiliary energy, an impulse relay effective when energized to disconnect the section rails from said track relay winding and to connect them with said auxiliary energy source, a transformer connected in energy supplying relation with the operating winding of said impulse relay, a direct current exciting circuit for said transformer which includes a contact of said track relay, and which is so arranged that that transformer supplies a momentary pulse of pick-up energy to said impulse relay each time that the track relay releases and thereby causes said section rails then to receive a pulse of auxiliary energy, and traffic controlling apparatus at the exit end of said section governed by the said auxiliary energy which is there received from said rails.

10. In combination, a section of railway track, means for supplying coded signal control energy to the rails of said section, a code following track relay having an operating winding which is connected with said rails, a source of auxiliary energy, an impulse relay effective when energized in the normal polarity direction to disconnect the section rails from said track relay winding and to connect them with said auxiliary energy source, a transformer connected in energy supplying relation with said impulse relay, a direct current exciting circuit for said transformer, a contact of said track relay included in said circuit for the purpose of causing the transformer to generate a pulse of normal polarity output voltage each time that the track relay releases whereby to produce a response by said impulse relay which causes said section rails then to receive a pulse of auxiliary energy, and traffic controlling apparatus at the exit end of said section governed by the said auxiliary energy which is there received from said rails.

11. In combination with a section of track to the rails of which coded signal control energy is continuously supplied and with the said rails of which a code following track relay is connected, approach control facilities comprising a source of auxiliary energy, an impulse relay effective when energized in the normal polarity direction to transfer said track rail connection from said track relay to said auxiliary energy source, a decoding transformer provided with a direct current exciting circuit which is controlled by said track relay, a secondary winding of said transformer connected to impress a pulse of normal polarity voltage upon the operating winding of said impulse relay each time that said track relay releases whereby to produce a response by said impulse relay which causes said section rails then to receive a pulse of auxiliary energy, and traffic controlling apparatus at the exit end of said section governed by the said auxiliary energy which is there received from said rails.

12. In combination with a section of track which forms a part of a railway signaling system of the coded track circuit class, approach control facilities comprising a direct current source of trackway energy at the section exit, a code following detector relay, a continuously operating coding contact which repeatedly connects the rails of said section first with said energy source and then with the winding of said detector relay and thereby produces a direct current trackway code consisting of alternate "on" and "off" periods the latter of which coincide with said detector relay connections, means for supplying said rails with a pulse of auxiliary energy during each of the said "off" periods of the said direct current trackway code which is received at the section entrance whereby those rails transmit each of those pulses forwardly to said detector relay and thus cause that relay to follow code as long as said section is unoccupied, a slow release approach relay energized in step with the responses of said detector relay and maintained picked up by that energization as long as the detector relay continues to follow code, and means at the section exit for locally generating an alternating current voltage and for superimposing said voltage upon said direct current trackway code whenever said approach relay becomes released in response to the presence of a train in said section.

13. In combination with a section of track which forms a part of a railway signaling system of the coded track circuit class, approach control facilities comprising a source of direct current energy at the section exit, a code following detector relay, a continuously operating coding device having a contact which repeatedly connects the rails of said section first with said energy source and then with the winding of said detector relay and thereby produces a direct current trackway code consisting of alternate "on" and "off" periods the latter of which coincide with said detector relay connections, means for supplying said rails with a pulse of auxiliary energy during each "off" period of the said direct current trackway code which is received at the section entrance whereby those rails transmit each of those pulses forwardly to said detector relay and thus cause that relay to follow code as long as said section is unoccupied, a slow release approach relay energized in step with the responses of said detector relay and maintained picked up by that energization as long as the detector relay continues to follow code, and means at the section exit for converting energy from said direct current source into an alternating current voltage and for superimposing said voltage upon said direct current trackway code whenever said approach relay becomes released in response to the presence of a train in said section.

14. In combination with a section of track to the rails of which coded signal control energy consisting of alternate "on" and "off" periods is continuously supplied, approach control facilities comprising a code following pilot relay connected with said rails at the section entrance and arranged to be operated by the said coded energy which is received from those rails, a code following track relay locally energized over a contact of said pilot relay and arranged to duplicate the code following operations of the pilot relay, a source of auxiliary energy, means governed by said track relay for disconnecting said track rails from the operating winding of said pilot relay and for connecting them with said auxiliary energy source during each of said "off" periods of the received signal control code whereby to cause those rails to receive a pulse of auxiliary energy during each of those "off" periods, a slow release approach relay installed at the section exit and energized in step with the pulses of auxiliary energy which are there received from the section rails whereby to be maintained picked up as long as said section remains vacant and to release when a train comes into the section, and traffic governing apparatus controlled by said approach relay.

15. In a railway signaling system which includes a section of track to the rails of which coded track circuit energy consisting of alternate "on" and "off" periods is continuously supplied, the combination of approach control facilities comprising a code following pilot relay connected with said rails at the section entrance and arranged to be operated by the said coded energy which is received from those rails, a code following track relay locally energized over a contact of said pilot relay and arranged to duplicate the code following operations of the pilot relay, a source of auxiliary energy, an impulse relay effective when energized to disconnect the rails of said section from the operating winding of the pilot relay and to connect them with said auxiliary energy source, means controlled by said track relay for momentarily energizing said impulse relay at the beginning of each of the said "off" periods of the received signal control code whereby to produce a response by said impulse relay which causes said section rails then to receive a pulse of auxiliary energy, a slow release approach relay located at the exit end of the section and energized in step with the pulses of auxiliary energy which are there received from the section rails whereby to be maintained picked up as long as said section remains vacant and to release when a train comes into the section, and traffic governing apparatus controlled by said approach relay.

16. In combination, a section of railway track, means for supplying coded signal control energy to the rails of said section, a code following pilot relay having an operating winding which is connected with said rails, said pilot relay following the coding of the said signal control energy which is received from those rails, a code following track relay locally energized over a contact of said pilot relay and arranged to duplicate the code following operations of the pilot relay, an impulse relay effective when energized in the normal polarity direction to disconnect the section rails from said track relay winding and to connect them with said auxiliary energy source, a transformer connected in energy supplying relation with said impulse relay, a direct current exciting circuit for said transformer, a contact of said track relay included in said circuit for the purpose of causing the transformer to generate a pulse of normal polarity output voltage each time that the track relay releases whereby to produce a response by said impulse relay which causes said section rails then to receive a pulse of auxiliary energy, and traffic controlling apparatus at the exit end of said section governed by the said auxiliary energy which is there received from said rails.

17. In combination with a section of railway track, a source of energy for the rails of said section, a code following detector relay provided with a pick-up circuit and with a stick circuit, a continuously operating coding device, means including a first contact of said device for repeatedly connecting the track section rails first to said energy source and then to said relay pick-up circuit, means effective under vacant conditions of said track section for supplying said rails with a pulse of auxiliary energy during each period that said pick-up circuit is connected with those rails whereby to cause said detector relay recurrently to pick up as long as the track section remains vacant, means including a second contact of said coding device for completing said stick circuit from the time of each pick up of the detector relay until the end of the code period within which that pick up occurs whereby to prolong the hold-up time of that relay for the full duration of each of said code periods, means for causing said second contact of the coding device to act in parallel with said first contact thereof in making and breaking the connection of said track rails with said energy source whereby to reduce the duty imposed upon said first contact, and traffic controlling apparatus governed by said detector relay and rendered active when and only when the said pick-up circuit of that relay is deprived of said recurring pulses of auxiliary energy by the rail shunting action of a train within said section.

18. In combination, a section of railway track, means for supplying the rails of said section with coded signal control energy which consists of alternate "on" and "off" periods, means effective under vacant conditions of the section for also supplying said rails with a pulse of auxiliary energy during each of the said "off" periods of said signal control code, a code following detector provided with a pick-up circuit and with a stick circuit, means for connecting said pick-up circuit in energy receiving relation with the section rails during each of said "off" code periods whereby said auxiliary energy picks up the detector relay during each of those periods as long as said section remains vacant, a slow release approach relay energized in step with the responses of said detector relay and thereby maintained picked up as long as the detector relay follows code, means for completing said stick circuit of the detector relay from the time of each pick up of that relay until the end of the "off" code period within which that pick up occurs whereby to prolong the energization of said detector relay for the full duration of each of said "off" periods, means for delaying the release of the detector relay beyond each interruption of its said stick circuit whereby to reduce the delay period of said approach relay which is necessary to span the intervals between said recurrent responses of said detector relay, and traffic controlling apparatus governed by said approach relay and rendered active when that relay releases in response to the rail shunting action of a train within said section.

19. In combination, a section of railway track, means for supplying the rails of said section with coded signal control energy which consists of alternate "on" and "off" periods, means effective under vacant conditions of the section for also supplying said rails with a pulse of auxiliary energy during each of the said "off" periods of the signal control code, a code following detector relay provided with a pick-up winding and with a stick winding, means for connecting said pick-up winding across said rails during each of the said "off" code periods whereby to supply said auxiliary energy to that winding and thereby pick up the detector relay, a source of stick energy, means for connecting said stick winding to said source from the time of each pick-up of the detector relay until the end of the said "off" code period within which that response occurs whereby to prolong the hold-up time of said detector relay for the full duration of each of said "off" periods, a slow release approach relay energized in step with the responses of said detector relay and thereby maintained picked up as long as the detector relay follows code, a snubbing impedance bridged across said stick winding to impart slow release characteristics to the detector relay whereby to reduce the delay period of said approach relay which is necessary to span the intervals between said recurrent responses of said detector relay, and traffic controlling apparatus governed by said approach relay and rendered active when that relay releases in response to the rail shunting action of a train within said section.

20. In combination with adjoining forward and rear sections of railway track, means for supplying the rails of said forward section with recurrent "on" and "off" periods of energy coded at a high speed rate under certain conditions and at a low speed rate under other conditions, a code following track relay connected with said forward section rails at the entrance end of the section, a source of auxiliary energy, means governed by said track relay for disconnecting said rails from that relay and for connecting them with said auxiliary energy source during each of the said "off" periods of the received trackway code, a first decoding relay controlled by said track relay and arranged to respond when the track relay is following either of said two trackway codes, a second decoding relay also controlled by said track relay but arranged to respond to said high speed code only, a normally inactive wayside signal positioned at the entrance of said forward section of track and controlled by said two decoding relays, and an approach relay arranged to render said signal active whenever a train enters said rear section of track.

21. In combination with adjoining forward and rear sections of railway track, means for supplying the rails of said forward section with energy coded at a high speed rate or at a low speed rate, a code following track relay operated by energy received from said forward section rails, a first decoding relay controlled by said track relay and responsive to either of said two trackway codes, a second decoding relay also controlled by said track relay but responsive to said high speed code only, a normally inactive wayside signal located at the entrance of said section and controlled by said two decoding relays, means controlled by said first decoding relay for supplying the rails of said rear track section with recurrent "on" and "off" periods of energy coded at said high speed rate or at said low speed rate, means for also supplying said rear section rails with a pulse of auxiliary energy during each of said "off" periods of the trackway code which is received at the entrance of the rear section, a code following detector relay responsive to said code step pulses of auxiliary energy which are received from said rear section rails at the exit of the rear section, a slow release approach relay locally energized in step with the responses of said detector relay and arranged to render said signal active whenever said rear track section is occupied, and means controlled by said first decoding relay for interrupting the energizing circuit for said approach relay and thereby also rendering said signal active whenever said forward section is occupied.

22. In combination, a track section divided from the remaining track by insulating joints, a source of track circuit current at each end of said section, a track relay for each end of said section, movable contact means at each end of said section for connecting either the source of track circuit current or the track relay at such end across the track rails but not both, means for causing intermittent operation of said contact means so that the track relay at one end and the track circuit source at the other end and the track relay at said other end and the track circuit source at said one end are alternately connected to the track rails, whereby two track circuits are alternately established on the same track section, and signals controlled by said track relays.

23. In combination; a track section divided from the remaining track by insulating joints; a source of track circuit current at each end of said section; a track relay for each end of said section; movable contact means at each end of said section for connecting either the source of track circuit current or the track relay at such end across the track rails but not both; means for causing intermittent operation of said contact means to establish track circuits alternately, one track circuit of which includes the source of track circuit current at one end, the track rails and the track relay at the other, and the other track circuit of which includes the source of track circuit current at the other end, the track rails and the track relay at said one end.

HERMAN G. BLOSSER.